United States Patent [19]

Feller

[11] Patent Number: 5,098,452
[45] Date of Patent: Mar. 24, 1992

[54] METHOD FOR CONTROLLING THE LEVEL OF SOLVENT VAPOR IN A VESSEL

[75] Inventor: John A. Feller, Olingen, Luxembourg

[73] Assignee: E. I. Du Pont de Nemours and Company, Wilmington, Del.

[21] Appl. No.: 571,724

[22] Filed: Aug. 24, 1990

[51] Int. Cl.⁵ ............................................. B01D 53/00
[52] U.S. Cl. ...................................... 55/210; 55/212; 55/219; 264/40.1; 264/40.4; 264/205
[58] Field of Search .................. 55/18, 210, 212, 219; 73/30.01; 425/74-75; 264/40.4, 204, 205, 40.1

[56] References Cited

U.S. PATENT DOCUMENTS

| | | | |
|---|---|---|---|
| 2,722,593 | 11/1955 | McAlister | 202/182 |
| 3,011,956 | 12/1961 | Smith et al. | 203/20 |
| 3,357,234 | 12/1967 | Thaler | 73/30.01 |
| 3,883,630 | 5/1975 | Raganato | 264/204 |
| 4,289,586 | 9/1981 | Sabatka | 202/182 |
| 4,386,897 | 6/1983 | Hungerford | 425/71 |

FOREIGN PATENT DOCUMENTS 831 of 1853 United Kingdom .
70 of 1894 United Kingdom .

Primary Examiner—Hubert C. Lorin

[57] ABSTRACT

A method is disclosed for controlling the interfacial level of solvent vapor and overhead gas in a vessel. The solvent vapor level is controlled by means of a displacement body which is suspended from a load cell. The displacement body is partially immersed in the solvent vapor with the remainder being immersed in the overhead gas covering the solvent vapor. The displacement body's apparent weight is measured by the load cell and used to control the rate of solvent vapor removal from the spin-cell thereby maintaining the solvent vapor/overhead gas interface in the spin-cell at a desired level.

5 Claims, 3 Drawing Sheets

METHOD FOR CONTROLLING THE LEVEL OF SOLVENT VAPOR IN A VESSEL

FIELD OF THE INVENTION

The present invention relates to a method for controlling the level of solvent vapor in a vessel. In particular, the invention relates to the use of a displacement body and load cell to control the level of the solvent vapor/overhead gas interface contained in a plexifilamentary spin-cell.

BACKGROUND OF THE INVENTION

A process for producing plexifilamentary strands of fiber-forming polymers is described in U.S. Pat. No. 3,081,519 to Blades et al. Specifically, Blades et al. disclose extruding a homogeneous solution of a fiber-forming polymer in a liquid, which is a non-solvent for the polymer below its normal boiling point, at a temperature above its normal boiling point, into a medium of lower temperature and pressure. The vaporizing liquid within the extrudate forms bubbles, breaks through the confining walls and cools the extrudate, causing solid polymer to form therefrom. The resulting multifibrous yarn-like strand has an internal fine structure or morphology which may be characterized as a three-dimensional integral plexus consisting of a multitude of essentially longitudinally extended interconnecting random length fibrous elements often referred to as film fibrils. A strand comprising a three-dimensional network of film-fibril elements is generally referred to as a plexifilament.

In U.S. Pat. No. 3,227,794 to Anderson et al., a process is disclosed for flash spinning a fibrillated plexifilamentary material by supplying polymer and solvent for the polymer at elevated temperature and pressure in order to provide a solution containing 2 to 20 wt. % polymer. Thereafter, the solution is passed to a zone having a pressure above the two-liquid-phase pressure boundary for the solution and discharged through an extrusion orifice of restricted size into an area of substantially atmospheric temperature and pressure. As a result, the solvent almost instantaneously evaporates and cools the polymeric material during adiabatic expansion to form a solidified plexifilamentary strand.

The plexifilamentary strands produced by these processes are particularly useful in preparing nonwoven fibrous sheets as described in U.S. Pat. No. 3,169,899 to Steuber. In preparing such sheets, the extruded material is passed horizontally from the extrusion orifice directly to the surface of a rotating or oscillating deflector which opens the plexifilament into a wide web. The deflector directs the web downward onto a moving collection belt so that it is collected in random, multidirectional, overlapping layers. In order to electrostatically pin the web to the belt, means are provided for creating opposite charges on the strands and the collection belt. The flash spinning apparatus, comprising extrusion orifice, electrostatic charging means and deflector means for directing plexifilamentary strands onto the collection belt, is typically referred to as a spin pack.

The solvents used in these processes are generally haloalkanes and have normal boiling points at least about 25° C. below the polymer's melting temperature. Trichlorofluoromethane (CFC-11) and methylene chloride are frequently employed at levels of from about 80 to about 90% by weight of the polymer solution. Since these large quantities of solvent form no part of the ultimate sheet product, it is both economically and environmentally desirable that the solvent be reclaimed and reused.

Typically, the solvent is reclaimed by extruding the solution in a substantially closed spin-cell which surrounds the spin packs and other sheet-forming equipment. U.S. Pat. No. 3,504,076 to Lee discloses improving the properties of nonwoven plexifilamentary webs of polyethylene by utilizing a substantially closed spin-cell in which the gaseous atmosphere is maintained at temperatures of from about 34° C. to 60° C. The gaseous atmosphere inside the spin-cell is predominantly solvent vapor with a minor volume of overhead air that covers the solvent vapor. The solvent is primarily recovered by withdrawing, compressing and then condensing the solvent vapor. The atmosphere surrounding the spin packs is preferably maintained at 100% solvent vapor so that the overhead air does not affect electrostatic charging of the web. Therefore, the overhead air covering the solvent vapor must be continously maintained above the level of the spin packs in order for the electrostatic charging and laydown process to work effectively. In addition, the solvent vapor level should not rise above the ceiling of the spin-cell since solvent vapor lost during spin pack maintenance represents a potential hazard to stratospheric ozone.

Clearly, what is needed is a method for controlling the level of vapor solvent contained in a vessel, and more particularly a spin-cell. It is therefore an object of the present invention to provide a method for controlling the level of the solvent vapor/overhead gas interface contained in a spin-cell used to produce nonwoven film-fibril sheets. Other objects and advantages of the present invention will become apparent to those skilled in the art upon reference to the attached drawings and to the detailed description of the invention which hereinafter follows.

SUMMARY OF THE INVENTION

In accordance with the present invention, there is provided a method for controlling the interfacial level of solvent vapor and overhead gas in a vessel in order that the solvent vapor does not readily escape to the atmosphere. The method comprises maintaining the level of the solvent vapor/overhead gas interface within the vessel at a level below the vessel ceiling by using a control means comprising a displacement body partially immersed in the solvent vapor with the remainder immersed in a layer of overhead gas covering the solvent vapors, the displacement body being suspended from a load cell adapted to measure the apparent weight of the displacement body and to generate a signal proportional to the level of the solvent vapor/overhead gas interface, which signal is utilized to control removal of solvent vapor from the vessel and thereby maintain the solvent vapor/overhead gas interface in the vessel at a desired level.

Preferably, there is provided a method for controlling the level of the solvent vapor/overhead gas interface contained in a plexifilamentary spin-cell. The method comprises an improvement in a process for producing nonwoven plexifilamentary webs comprising:

(a) extruding a polymer solution through at least one spin pack into a gaseous atmosphere of a substantially closed spin-cell maintained at substantially normal atmospheric pressure, said solution comprising from 2 to 20% by weight of a synthetic crystalline polymer and from 80 to 98% by weight of a liquid which is a solvent for the polymer at the extrusion temperature and substantially a non-solvent for the polymer at the temperature at which the spin-cell is maintained, the solution being at a sufficiently high temperature and pressure to maintain the solution in a single liquid phase;

(b) collecting the resulting plexifilamentary web on collection means within the spin-cell to form a continous sheet of random, multidirectional, overlapping layers; and (c) withdrawing the sheet from the substantially closed spin-cell;

the improvement comprising maintaining the level of the solvent vapor/overhead gas interface within the spin-cell at a level above the spin pack and below the spin-cell ceiling by using a control means comprising a displacement body partially immersed in the solvent vapor with the remainder immersed in a layer of overhead gas covering the solvent vapors, the displacement body being suspended from a load cell adapted to measure the apparent weight of the displacement body and to generate a signal proportional to the level of the solvent vapor/overhead gas interface, which signal is utilized to control removal of solvent vapor from the spin-cell and thereby maintain the solvent vapor/overhead gas interface in the spin-cell at a desired level.

Preferably, the polymer is linear polyethylene and the solvent is trichlorofluoromethane (CFC-11) or methylene chloride. However, other polymers and other organic solvents (particularly chlorofluorocarbons (CFC's) and hydrochlorofluorocarbons (HC's)) may be used successfully in the invention and are disclosed in U.S. Pat. No. 3,081,519 to Blades & White. Non-limiting examples of these solvents include CFC-12, HC-123, HC-123a, HC-123b, HC-132, HC-132a, HC-132b, HC-132c, HC-141, HC-141a, HC-141b, butane, pentane, and cyclohexane.

Moreover, successful operation of the invention requires a substantial difference in density between the solvent vapor and the overhead gas layer. For purposes of the invention, "substantial" means that the density of the solvent vapor is at least about 1.5 times greater than the density of the overhead gas. Typically, the overhead gas will be air, but it is to be understood that other gases which are inert to the flash spinning operation and are of lower density than the solvent vapor may comprise the overhead gas. Nitrogen is a good example of such an overhead gas.

DETAILED DESCRIPTION OF THE PREFERRED EMBODIMENT

Figure 1:
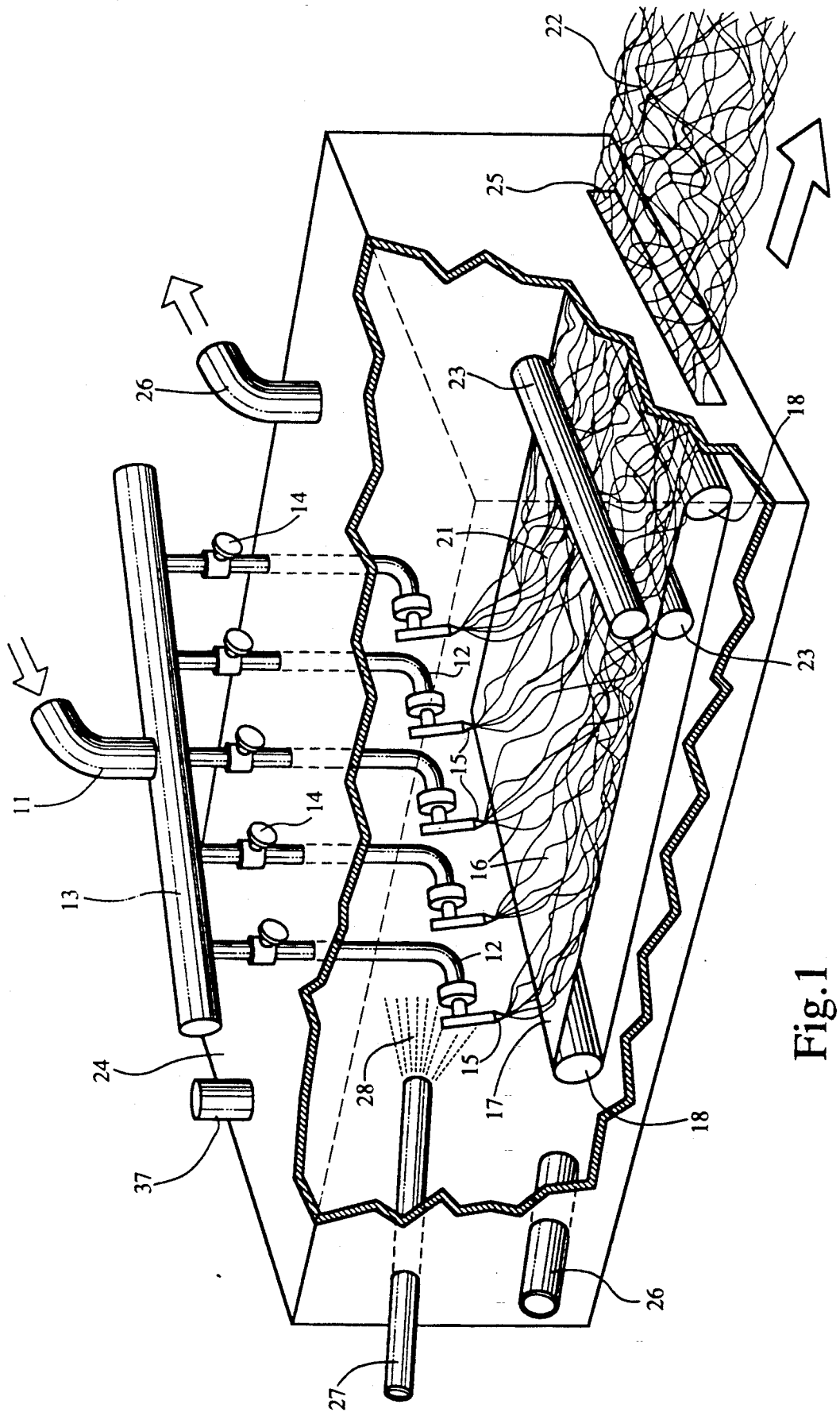
FIG. 1 is a partially cut-away schematic representation in perspective of a spin-cell apparatus suitable for use in the present invention.

Referring now to FIG. 1, random webs of plexifilaments are formed by forcing hot, pressurized polymer solution through transfer line 11 and distributing the solution to a down-leg 12 of each extrusion position by a manifold 13. At least one valve 14 is ordinarily provided in each down-leg 12. Extrusion of the solution through a plurality of die assemblies 15 produces a plexifilament 16 which is opened, transversely oscillated, charged and directed downward onto a moving endless collection belt 17 driven by rolls 18. The plexifilament 16 forms a loose web 21 of random, multidirectional, overlapping layers which can be formed into a sheet by properly spacing a plurality of die assemblies 15. As the moving web 21 passes along on the collection belt 17, it is condensed to a coherent sheet 22 by, for example, lightly pressurized calendar rolls 23 and then drawn out from a substantially closed spin-cell 24 through a suitably vapor-sealed opening 25.

Additionally provided in spin-cell 24 are an exhaust port 26 for removal of the gaseous atmosphere from the spin-cell 24 and auxiliary cooling means represented by a pipe 27 for injecting fine droplets 28 of a volatile liquid. Both of these positions are represented schematically only. It should be noted that more than one exhaust port 26 may be provided for reclaiming vaporized solvent and, ordinarily a plurality of cooling position pipes 27 are spaced throughout spin-cell 24 to assure uniform temperature of the substantially closed spin-cell atmosphere at all spin pack positions. It is known that spinning preferably is done into solvent vapor rather than into air because air disrupts electrostatic charging of the web. The spin-cell is maintained at atmospheric pressure by means of a stack 37 in the spin-cell ceiling.

Figure 2:
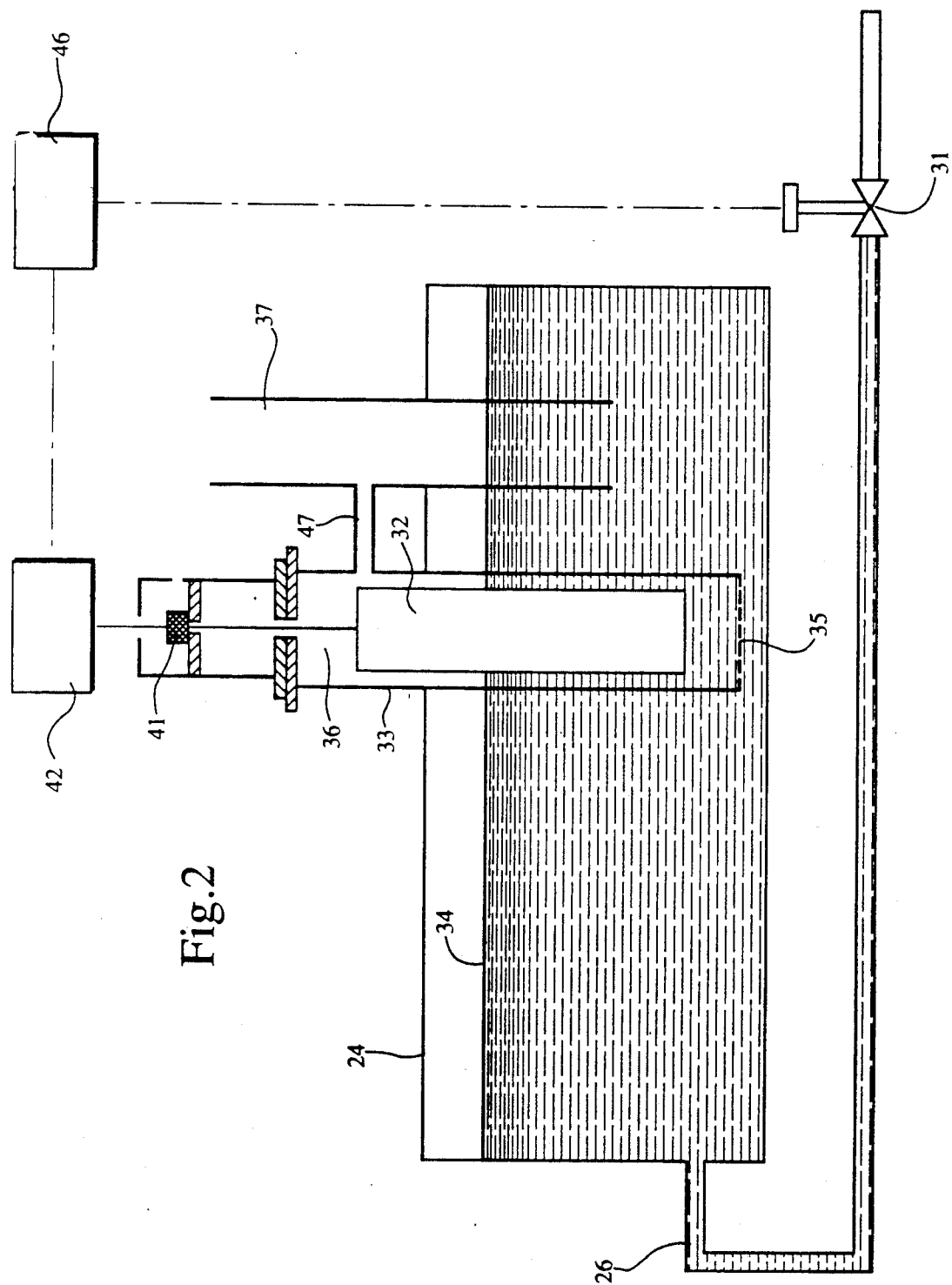
FIG. 2 is a schematic side elevation of a spin-cell apparatus suitable for use in the present invention.

Referring now to FIG. 2, the spin-cell 24 is depicted schematically with vapor exhaust port 26 fitted with control valve 31. Cylindrical displacement body 32 is contained within a hollow cylinder 33 which extends into spin-cell 24. Spin-cell 24 is filled up to line 34 with solvent vapor, and above line 34 with air. This occurs because the density of the solvent vapor is many times greater than that of air. Thus, line 34 represents the interface between solvent vapor and overhead air within spin-cell 24. The bottom of hollow cylinder 33 is open to the solvent vapor inside spin-cell 24 but covered by a mesh screen 35 in order to prevent small polymeric particles from accumulating on displacement body 32 and increasing its weight. The top 36 of hollow cylinder 33 is open to the outside atmosphere. The top of spin-cell 24 is open to the outside atmosphere through port 37 from which a connection 47 is made to the top of hollow cylinder 33. Thus, the level of the interface between solvent vapor and overhead air within hollow cylinder 33 is the same as interface 34 in the remainder of spin-cell 24. Displacement body 32 is suspended from load cell 41. As displacement body 32 is buoyed up or down by the level of the interface 34 between solvent vapor and air in spin cell 24, an electrical signal is generated in load cell 41 which is amplified by amplifier 42 and transmitted to control the opening and closing of valve 31 via level controller 46, thus maintaining interface 34 within spin-cell 24 at a desired level.

Figure 3:
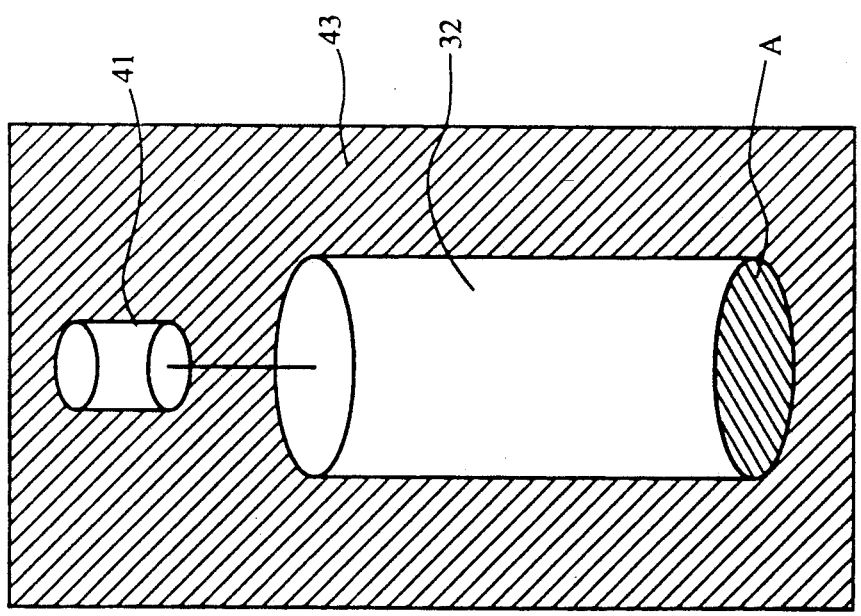
FIG. 3 is a schematic perspective view of a displacement body useful in the present invention immersed in air.

Referring now to FIG. 3, a displacement body 32 is shown suspended from load cell 41 and surrounded by air 43. In this case, W is the weight sensed by the load cell 41 and Wo is the weight of the displacement body 32 in air. δA is the vapor density of air 43 and A is the cross-sectional area of displacement body 32.

Figure 4:
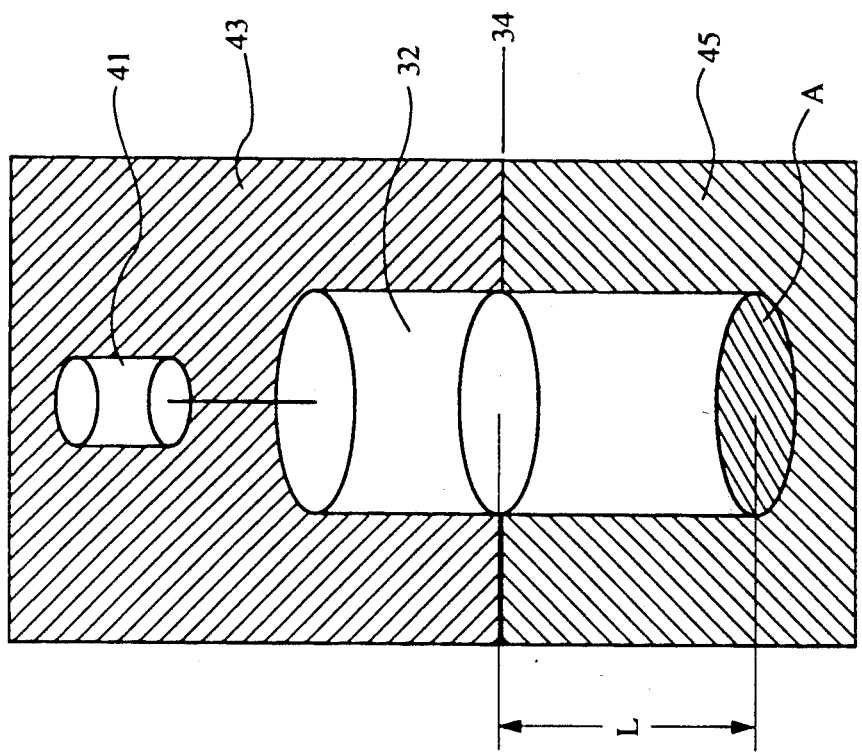
FIG. 4 is a schematic perspective view of a displacement body useful in the present invention immersed in a chlorofluorocarbon vapor zone covered with an overhead layer of air.

Referring now to FIG. 4, L is the level of solvent vapor 45 surrounding the bottom of displacement body 32. δ₂ is the vapor density of the solvent vapor 45 being used, such as trichlorofluoromethane which is about five times the density of air 43. Thus, the weight W sensed by load cell 41 is determined by the equation $W = Wo - (\delta_2 - \delta_A) \cdot A \cdot L$. Thus, the level L of solvent vapor in which displacement body 32 is immersed is determined by the equation.

$$L = \frac{Wo - W}{A(\delta_2 - \delta_A)}$$

Load cell 41 generates an electrical signal proportional to solvent vapor level L. The signal is amplified by amplifier 42, which amplified signal activates valve 31 (FIG. 2) to control the level of solvent vapor 45 in spin-cell 24.

For a displacement body with a cross-sectional area of 100 cm² (112.8 mm diameter), a 10 cm solvent vapor level change corresponds to a 4 to 5 gram apparent weight change, as reported in the Table below. The load cell 41 thus must be sensitive enough to adequately measure those relatively small force changes while still supporting the preload provided by the displacement body weight. This dictates the use of a low weight displacement body 32. Additionally, the displacement body 32 must be greater or equal in length than the required measuring range. Typically, about two-thirds of the displacement body length protrudes into the spin-cell and about one-third of the displacement body length extends above the spin-cell ceiling. If desired, the load cell output signal can be temperature compensated, as illustrated in the Table below, with the linear deviation being about 0.34% per degree C. over the range involved in a system of trichlorofluoromethane (CFC-11) solvent vapor and air. Direct density compensation is also possible by immersing a second displacement body totally into the solvent vapor and measuring its apparent weight decrease which is directly proportional to the solvent vapor density.

TABLE

| Temperature °C. | Density of Dry Air g/l | Density of CFC-11 g/l | Displacement per liter g |
| --- | --- | --- | --- |
| 30 | 1.165 | 5.729 | 4.564 |
| 40 | 1.127 | 5.523 | 4.396 |
| 50 | 1.093 | 5.333 | 4.240 |

Precise control of the solvent vapor level is important to effective sheet formation because the solvent vapor level must be high enough to cover the electrostatic charging system associated with the plurality of die assemblies 15, but low enough to prevent losses of solvent vapor to the outside atmosphere if the top of the spin-cell 24 is opened to effect changes of one or more die assemblies 15 or other associated maintenance. Preferably, the level of the interface of the solvent vapor and overhead air is maintained at a level of 0 to 3 inches below the level of the spin-cell ceiling.

The following non-limiting example provides a displacement body which resulted in precise control of the solvent vapor level in spin-cell 24.

EXAMPLE

A 1800 mm long cylindrical displacement body of 150 mm diameter was constructed of pure Nickel having a weight of 990 grams. The displacement body was hung on a load cell with a 1000 gram measuring range and an accuracy of less than about 1.0 gram. The buoyancy difference of the displacement body hanging in air, versus being completely emmerged into CFC-11 vapor, was about 150 grams. Thus, the accuracy with respect to the spin-cell level was less than about 12 mm.

In order to avoid perturbations by turbulence and fly accumulation on the displacement body, the body was hung inside a 10 inch pipe having an open bottom and a 10 mesh screen attached thereto. The top of the pipe was open to the atmosphere. The load cell was installed on top of the 10 inch pipe in such a way that an O-ring seal prevented its exposure to solvent vapors and the whole arrangement was sealed from the atmosphere. The load cell amplifier was adjusted to have a 4 mA output at 1000 grams and a 20 mA signal at 850 grams, which allowed a direct 0 to 100% level reading. The displacement body was suspended so that it hung 1200 mm below the spin-cell ceiling and extended 600 mm above the spin-cell ceiling. This means that the level indicates about 66% under normal operating conditions. The above-described arrangement provided excellent signal-to-noise ratio, insensitivity to pressure fluctuations during spin-cell sparging and storms, and good reliability.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

I claim:

1. A method for controlling the interfacial level of solvent vapor and overhead gas in a vessel comprising maintaining the level of the solvent vapor/overhead gas interface within the vessel at a level below the vessel ceiling by using a control means comprising a displacement body partially immersed in the solvent vapor with the remainder immersed in a layer of overhead gas covering the solvent vapors, the displacement body having a weight greater than the solvent vapor being displaced and being suspended from a load cell adapted to measure the apparent weight of the displacement body and to generate a signal proportional to the level of the solvent vapor/overhead gas interface, which signal is utilized to control removal of solvent vapor from the vessel and thereby maintain the solvent vapor/overhead gas interface in the vessel at a desired level.

2. The process of claim 1 wherein the solvent is selected from the group consisting of trichlorofluoromethane and methylene chloride.

3. The process of claim 1 wherein the overhead gas is selected from the group consisting of air and nitrogen.

4. The process of claim 1 wherein the signal generated by the load cell is electrical.

5. The process of claim 1 wherein the level of the solvent vapor/overhead gas interface is maintained between 0 to 3 inches from the top of the vessel.

* * * * *